Patented Apr. 20, 1948

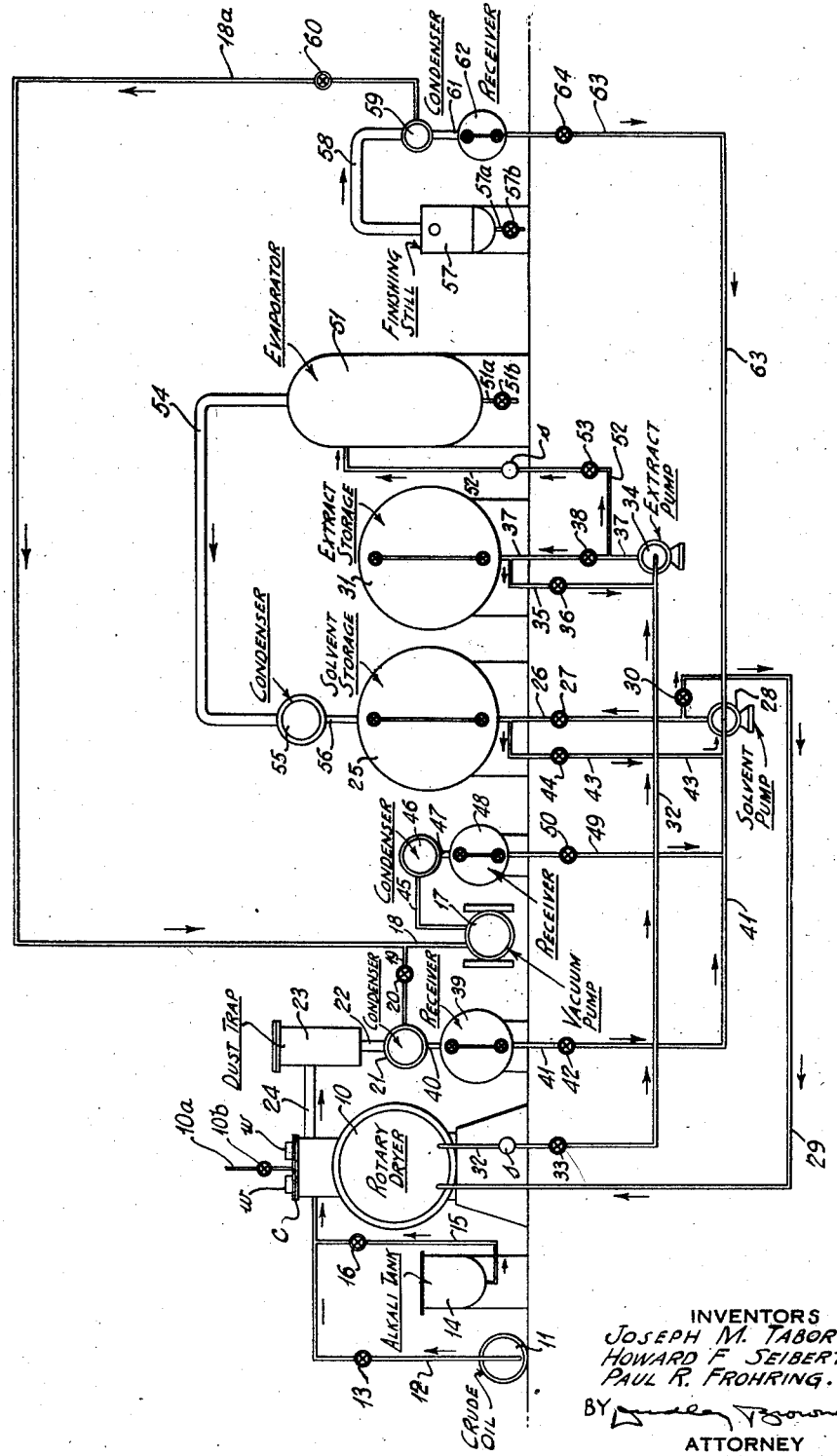

2,440,029

UNITED STATES PATENT OFFICE 2,440,029

METHOD FOR EXTRACTING PIGMENTS

Joseph M. Tabor, Cleveland, and Howard F. Seibert and Paul R. Frohring, Chagrin Falls, Ohio, assignors to General Biochemicals, Inc., Chagrin Falls, Ohio, a corporation of Ohio Application October 13, 1943, Serial No. 506,060

1 Claim. (Cl. 260—236.5)

This invention relates to a method and apparatus for extracting pigments, including specifically carotene, and carotinoid pigments, from fatty materials, such, for example, as animal or vegetable oils and fats.

An object of the invention is to provide a simple and efficient apparatus and method for extracting pigments including plant pigments.

Another object is to provide practical, commercial apparatus comprising a closed fluid system.

Another object of the invention is to provide a process of extracting pigments which is well adapted to protect the pigment or pigments from decomposition during the performance of the process.

Another object of the invention is to provide a method of the above mentioned kind all the steps of which may be performed in a single vessel, thereby eliminating expensive grinding, drying and transferring equipment.

A further object of the invention is to provide such a process in the carrying out of which soap is produced as a valuable by-product.

Other objects will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claim.

The accompanying drawing is a front elevation showing diagrammatically apparatus for carrying out the invention.

In carrying out our invention we provide the vessel 10 in which all steps of the herein described method are performed, and connect vessel 10 with the container 11 which contains the material from which the pigment is to be extracted, by conduit 12, having therein valve 13; with the container 14 for a saponifying agent by conduit 15 which has therein valve 16, and which may discharge into conduit 12 between valve 13 and vessel 10 as illustrated herein; with vacuum pump 17 through vacuum line 18, having the branch line 19, in which valve 20 is provided, and which leads to vacuum condenser 21 which is connected by conduit 22 to the dust trap 23, which in turn is connected with the vessel 10 through vapor line 24; with the solvent storage tank 25 through conduit 43, which has therein the valve 44, and leads to solvent pump 28, and through line 29 which branches off from line 26, through valve 30; and with extract tank 31 through line 32, which has therein valve 33, and line sight s, and communicates with extract pump 34, and through line 37, which has therein valve 38.

A receiver tank 39 is provided interconnected with vacuum condenser 21 by conduit 40 and interconnected with solvent storage tank 25, through line 41, which has the valve 42, through solvent pump 28, and through line 26 which has therein valve 27.

Vacuum pump 17 is also connected to solvent storage tank 25 through exhaust vapor line 45, leading to the atmospheric condenser 46, which is connected by conduit 47 to the receiver 48, which is connected to line 41, through branch line 49, having therein valve 50, through solvent pump 28, and through line 26 which has therein valve 27.

The above described system constitutes the apparatus for carrying out our extraction method which we perform in the single vessel 10. However, the following further apparatus may conveniently be connected with this system as follows: the evaporator 51 may be connected with extract tank 31 through conduit 52, having valve 53 and line sight s, and branching from line 37 below valve 38, and through extract pump 34, and through conduit 35 which has therein valve 36. As illustrated, conduit 52 is connected with evaporator 51 near its top. At the bottom of evaporator 51 a discharge outlet may be provided, indicated by the conduit 51a, having in its lower end valve 51b. Evaporator 51 may be interconnected with solvent storage tank 55 through vapor line 54 leading from the top of the evaporator 51, to atmospheric condenser 55 which in turn is interconnected to solvent storage tank 25 through conduit 56.

In addition to evaporator 51 a finishing still 57 may, if desired, be associated with the above described system, as by vapor line 58 leading from the finishing still 57 to the vacuum condenser 59, which in turn is connected to vacuum pump 17 by vacuum line extension 18a, which has therein valve 60 and is connected to vacuum line 18, and condenser 59 may be connected through conduit 61 with a receiving tank 62, which in turn is connected to storage tank 25 through the line 63, having therein valve 64, through solvent pump 28 and line 26.

There is thus provided a closed system, which may be exclusive of evaporator 51 and finishing still 57 and their connections to the remainder of the system, by means of which all of the steps of our extraction process may be performed as will now be described.

We first start vacuum pump 17, which as stated above, is connected with vessel 10 through conduits 18 and 19, condenser 21, conduit 22, dust trap 23 and vapor line 24. We draw into vessel 10, as by means of the partial vacuum maintained therein by vacuum pump 17, the raw material from which the pigment is to be extracted, which, for the purpose of exemplification, may consist of a source of carotinoid pigments, such, for example, as melted palm oil, supplied from tank 11 through conduit 12. In order to supply the palm oil to vessel 10 valve 13 is of course initially opened and is closed when the desired volume of palm oil has been discharged into vessel 10.

It will of course be understood that in a like manner, when communication is desired between vessel 10 and any of the elements of the system, the valve means for the element, described above, will be utilized to control the flow to or from vessel 10.

We next similarly draw into vessel 10 from tank 14, through conduits 15 and 12, after closing valve 13 and opening valve 16, an amount of a fifty percent aqueous caustic alkali which is chemically equivalent to, or preferably somewhat in excess of, the amount of melted palm oil drawn into vessel 10. The caustic alkali reacts with the oil causing saponification of the oil, as is well understood in the art, and we preferably promote this reaction by maintaining agitation in the vessel 10 during the entire saponification period. Preferably vessel 10 is an agitator and rotary drier of the spiral conveyor type the blades of which are set as close to the shell as possible.

The saponification reaction steps release an amount of heat sufficient to heat the soap as it is formed, in which a substantial amount of pigment material is entrapped, to vaporize the moisture in the newly formed soap lumps thus disintegrating them, and to raise the temperature in a container at atmospheric pressure to a degree which promotes rapid decomposition of the pigment being extracted. During this step and also succeeding steps we protect the pigment being extracted from such decomposition. We accomplish this by lowering and regulating the temperature in vessel 10 by controlling the degree of vacuum in vessel 10. The degree of vacuum necessary can be estimated from the decomposition point of the material which it is desired to extract. Thus, for example, carotene decomposes rapidly at temperatures above 80° C. Reference to standard steam tables shows that water boils at this temperature under a pressure of 355 mm. of mercury. Accordingly, the saponification pressure for carotene-bearing oils should not be allowed to exceed 355 mm. for any substantial period; since aqueous solutions under a given pressure boil at higher temperatures than water, depending on their concentrations, the saponification pressure is preferably kept lower than this.

The employment of reduced pressures has the further advantages that it results in the exclusion from vessel 10 of air the presence of which would be detrimental since it would promote decomposition by oxidation of the carotene or other pigment being extracted, and facilitates the breaking down of newly formed soap lumps and the consequent freeing therefrom, and the recovery of, pigment containing material.

Depending upon the characteristics of the particular kind of material or oil to be treated we have found, as stated above, that it is sometimes desirable to employ somewhat more of the alkali solution than is required to provide an amount which is the exact chemical equivalent of the amount of the oil or other fatty material being treated. We have found that certain oils have a tendency to form a soft soap, and that a harder soap, and one having better powdering characteristics, may be obtained by using an amount of alkali solution which is greater than the chemical equivalent of the particular oil or other fatty material being treated, the increased amount, over and above the chemical equivalent amount, being determinable by experimentation in each case. Thus, for example, we have found that in the treatment of palm oil we obtain very satisfactory results employing twenty percent more of the aforesaid fifty percent aqueous caustic alkali than is necessary for chemical equivalency with the amount of palm oil being treated.

During the saponification step the amount of heat evolved is sufficient to flash off the water in which the alkali was dissolved. The water vapor is withdrawn through vapor line 24, dust trap 23, and line 22, into condenser 21 where it is condensed, and may be drawn off, through an outlet, not shown, and discarded, when the saponification step is completed. The resulting soap is then in a very dry and finely powdered mass which requires no further processing before the pigment is extracted.

Saponification proceeds as soon as contact between the oil and the alkali is made, and the alkali should be distributed as evenly as possible throughout the oil because, if even distribution is not obtained, heavy balls of soap may form which will cause serious trouble. For this reason we prefer to provide one or more windows $w$ in the dome cover $c$ of vessel 10 through which the operator may watch the reaction closely, and if he observes any tendency of the mixture to foam he should release the vacuum momentarily, as by opening vacuum release valve 10b which communicates with the interior of vessel 10 through line 10a.

Performing the saponification step under vacuum contributes to the rapid elimination of steam from the soap mass, thereby reducing the lumps which ordinarily form during the saponification step, producing a very unexpectedly fine dry powder. In previous methods employed the soap was not completely powdered and the pigment entrapped in the lumps or unpowdered portion of the soap was lost.

When the saponification step is complete and the soap has been completely powdered, agitation within vessel 10 is discontinued and a solvent, such, for example, as one of a group comprising benzene, nitrobenzene, ethylene dichloride, and petroleum ether, is drawn directly into the vessel 10 from the solvent storage tank 25 through conduits 43 and 29, as described above. Enough solvent is added to bring the level thereof, in vessel 10, up to the top of the agitator means employed, which is not shown but which, as stated above, is preferably of the spiral conveyor type with the blades set as closely as possible to the shell of the vessel. The vacuum at this time is discontinued and agitation is recommenced and continued for approximately fifteen minutes or until the soap is thoroughly wetted. When the solvent and soap have been intimately mixed agitation is discontinued and the soap and the extract bearing solvent are allowed to separate by gravity. The clear extract bearing solvent is drawn off into the extract storage tank 31 through conduits 32 and 37, and pump 34, as is described above.

When the extract bearing solvent being withdrawn becomes cloudy as seen through line sight s in line 32, the withdrawal should be stopped.

When all the clear extract bearing solvent has been drawn out of vessel 10, fresh solvent for another wash may be drawn into vessel 10, in the manner set forth above, and agitation is resumed for approximately fifteen minutes or until the remaining soap is again thoroughly wetted with solvent, after which the agitation is stopped, the soap and the extract bearing solvent are again allowed to separate, and, after separation, the extract bearing solvent is drawn off again, as described above.

The extracting step may be repeated in this way as many times as economy of time and material permit.

After the additional washing steps, which comprise reintroducing solvent, mixing it with the soap in vessel 10, separating the soap and the extract bearing solvent, and separately withdrawing the extract bearing solvent, have been repeated the desired number of times, the vacuum pump 17 is started again and the vacuum condition within vessel 10 is restored and the soap is dried under vacuum. When the solvent stops distilling from the soap, dry steam is introduced into vessel 10, through an inlet not shown, and the last traces of solvent are removed from the soap by steaming for a short period, on the order of five minutes, while under vacuum, thereby further drying the extracted soap. The solvent separated by the steaming step is recovered in the vacuum and atmospheric condensers 21 and 46 respectively from which it is returned to solvent storage tank 26 as described above.

During the step of drying the soap remaining in drier 10 after the last wash the operator should be on guard to detect and prevent foaming and should momentarily release the vacuum in vessel 10 by opening vacuum release valve 10a if foaming occurs.

After the extraction of the pigment from the oil, as described above, has been completed, the soap, which is powdered and substantially pigment free, is removed from vessel 10, and the cycle of treatment in vessel 10 is complete. A new batch of oil may now be drawn into vessel 10 and the cycle repeated.

If it is desired to concentrate the extract collected in storage tank 26 it may be pumped into evaporator 51 through conduit 52 after opening valves 36 and 53 in lines 35 and 52 respectively and closing valves 38 and 33 in lines 37 and 32 respectively. Care should be taken to prevent any soap from coming into the evaporator 51. Any soap which may have gotten into tank 31 will separate by gravity and the extract may then be decanted from tank 31. Any soap which has found its way into tank 31 may therefore be retained therein and returned to vessel 10 in the first wash of the following batch of material being treated.

After concentration in evaporator 51 the extracts may be withdrawn, as by opening valve 51b, and cooled. At this stage the extracts will retain a certain amount of soap which we filter out, as for example, by the use of Buchner funnels using a liberal amount of filter aid, and we thereafter wash the resulting filter cake thoroughly with fresh solvent and transfer the combining filtrates into finishing still 57 where a final concentration step may be performed under vacuum, drawn by vacuum pump 17 through vacuum lines 18 and 18a, as by steam distilling said filtrates, with dry steam introduced into still 57 by an inlet not shown, for about five minutes to remove the last traces of solvent. Vapor released during this step is removed through vapor line 58 to the vacuum condenser 59, from which the recovered solvent is discharged into receiver 62, from which it may be returned to solvent storage tank 25 through return line 63, as described above.

The final concentrate may be withdrawn from still 57 through an outlet conduit 57a controlled by valve 57b. The extract at this point should be handled very carefully since excess heat and air are very detrimental. It should be run into suitable containers and sealed under nitrogen, the containers being completely filled so as to leave the minimum possible air space, and nitrogen should be bubbled through the solution to insure complete displacement of air just before sealing.

We have found that in treating 1000 lbs. of melted palm oil, in the apparatus and according to the method described above, the soap formed by the reaction of the oil and alkali will start to crumble in about twenty minutes after the alkali has been added, and will be completely pulverized after about an hour and fifteen minutes. The reduced pressure employed within vessel 10, together with the heat of reaction of the saponifying step creates a great temperature differential between the inside and the outside of the soap lumps and the vaporizing of the internally contained water vapor breaks up or explodes the lumps while they are hot and readily breakable, thus freeing an amount of pigment which may represent as much as twenty percent of the total yield. For each solvent wash approximately fifteen minutes is required until the soap is thoroughly wetted. The step of drying the soap, formed as a by-product of the extraction, requires on the order of four hours when using in vessel 10 a vacuum of approximately 26 inches of mercury, roughly a pressure of 100 mm. The over-all time required for the treatment of 1000 lbs. of palm oil from start to finish is about fourteen and a half hours.

One operator can readily control and carry out the operation of the system. During the drying period he may, if desired, use his time for filtering the extracts, after they have been concentrated in evaporator 51, say to approximately ten gallons for a batch of 1000 lbs. of palm oil.

The over-all yield of pigment obtained is high, being from 80% to 90% in the case of carotene extracted from palm oil. This result is due in large part to the reduction of lumps of soap, as explained above, thus permitting the pigment contained in the lumps to be freed and recovered instead of being lost.

It will thus be seen that there has been provided by this invention a method, apparatus, and an article in which the various objects hereinabove set forth together with many thoroughly practical advantages are successfully achieved. As various possible embodiments might be made of the mechanical features of the above invention, and as the art herein described might be varied in various parts, all without departing from the scope of the invention, it is to be understood that all matter hereinbefore set forth or shown in the accompanying drawings is to be interpreted as illustrative and not in a limiting sense.

What we claim is:

In a process of extracting a heat-sensitive pigment from a pigment-containing saponifiable fatty material, the steps which comprise: reacting said fatty material with an aqueous saponifying agent, agitating the mixture, comminuting the resulting soap by exhausting gases and vapors from the reaction zone to reduce the pressure therein and utilize the heat of saponification to boil and thus evaporate water dispersed throughout the soap mass, the reduction in pressure being such as to ensure a boiling temperature not above the decomposition point of the pigment, said temperature being not above 80° C., thereby disrupting and disintegrating such soap lumps as may form, continuing the evaporation under a partial vacuum effective to maintain a temperature not above the decomposition point of the pigment long enough to convert the soap to a substantially dry, finely divided soap mass, and extracting pigment from said finely divided mass with an organic solvent for said pigment which is a non-solvent for said soap.

JOSEPH M. TABOR.
HOWARD F. SEIBERT.
PAUL R. FROHRING.

REFERENCES CITED

The following references are of record in the file of this patent:

UNITED STATES PATENTS

| Number | Name | Date |
|---|---|---|
| Re. 20,772 | Clayton | June 28, 1938 |
| 2,136,030 | Stoni | Nov. 8, 1938 |
| 2,170,872 | Peebles | Aug. 29, 1939 |
| 2,245,536 | Thurman | June 10, 1941 |
| 2,266,830 | Taylor et al. | Dec. 23, 1941 |
| 2,271,406 | Thurman | Jan. 27, 1942 |
| 2,318,748 | Buxton | May 11, 1943 |
| 2,318,749 | Buxton | May 11, 1943 |
| 2,347,565 | Kokatnur | Apr. 25, 1944 |
| 2,383,630 | Trent | Aug. 28, 1945 |
| 2,383,631 | Trent | Aug. 28, 1945 |

Certificate of Correction

Patent No. 2,440,029.   April 20, 1948.

JOSEPH M. TABOR ET AL.

It is hereby certified that errors appear in the printed specification of the above numbered patent requiring correction as follows: Column 8, line 15, list of references cited, for "Stoni" read *Stone*; line 24, after "2,383,631 Trent _____ Aug. 28, 1945" add the following:

| | | |
|---|---|---|
| 2,264,390 | Levine et al. | Dec. 2, 1941 |
| 1,807,232 | Wurster et al. | May 26, 1931 |
| 2,324,195 | Carlson et al. | July 13, 1943 |
| 1,690,091 | Marcus | Oct. 30, 1928 |
| 2,031,991 | Ungnade et al. | Feb. 25, 1936 |

OTHER REFERENCES

Publication: "Chemistry and Physiology of the Vitamins", Rosenberg. Interscience Publishers, Inc., New York, 1942, page 43.

and that the said Letters Patent should be read with these corrections therein that the same may conform to the record of the case in the Patent Office.

Signed and sealed this 13th day of July, A. D. 1948.

[SEAL]

THOMAS F. MURPHY,
*Assistant Commissioner of Patents.*